Patented Nov. 24, 1925.

1,562,818

UNITED STATES PATENT OFFICE.

OTTO WOLFES AND HORST MAEDER, OF DARMSTADT, GERMANY.

PROCESS FOR THE PURIFICATION OF PHOSPHORIC ACID CONTAINING ARSENIC.

No Drawing.  Application filed May 5, 1925. Serial No. 28,217.

*To all whom it may concern:*

Be it known that we, OTTO WOLFES, residing at Darmstadt, 49 Hoffmannstrasse, Germany, and HORST MAEDER, residing at Darmstadt, 31 Wittmannstrasse, Germany, both citizens of the Republic of Germany, have invented a Process for the Purification of Phosphoric Acid Containing Arsenic, of which the following is a clear, full, and exact description.

Hitherto phosphoric acid was purified from arsenic either by treating ordinary commercial phosphoric acid with sulphureted hydrogen or heating it to a temperature of more than 200° C. The former method suffers from the disadvantage that the phosphoric acid is very apt to be contaminated by the oxidation products of the sulphureted hydrogen, while in the latter the arsenic is precipitated in such a very fine state of division that great difficulty is experienced in separating it from the acid. In addition, in consequence of the heating, concentration of the phosphoric acid takes place, a fact which renders operations more difficult.

Now, a very important discovery was made—namely, that phosphoric acid may be freed from arsenic by treating the acid with phosphoreted hydrogen, whereupon the arsenic is precipitated in flakes which may be readily separated by filtration, centrifuging, or other similar means. The effect is that no contamination of the phosphoric acid by the purifying agent through oxidation can take place.

*Example.*

Into an earthenware vessel provided with several inlet and outlet openings which can be closed as required place about 100 litres of phosphoric acid 80 per cent, replace the air by $CO_2$ and pass phosphoreted hydrogen through the liquid whereupon arsenic will be thrown down in the form of brownish-black flakes. After the reaction is complete drive out the remaining phosphoreted hydrogen by $CO_2$, dilute the phosphoric acid down to 60 per cent with distilled water, filter, and continue operations as usual.

We claim:

Process for the purification of phosphoric acid containing arsenic by treating it with phosphoreted hydrogen and removing the precipitated metallic arsenic.

In testimony whereof we have hereunto signed our names.

DR. OTTO WOLFES.
DR. HORST MAEDER.